B. G. LAMME.
ALTERNATING CURRENT MOTOR.
APPLICATION FILED JAN. 26, 1910.
1,189,703.
Patented July 4, 1916.
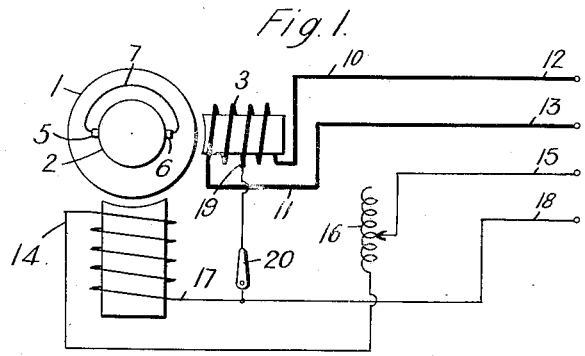
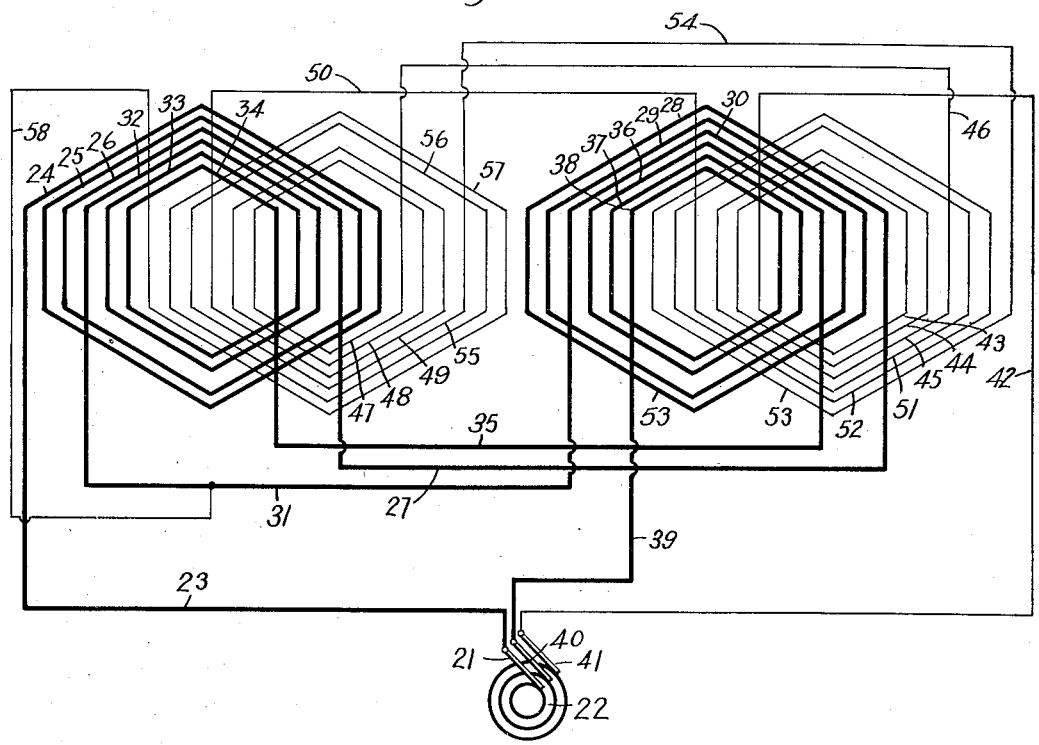
WITNESSES:
Fred H Miller
O. W. Kennedy
INVENTOR
Benjamin G. Lamme
BY
Wesley G. Carr
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

ALTERNATING-CURRENT MOTOR.

1,189,703.  Specification of Letters Patent.  Patented July 4, 1916.

Application filed January 26, 1910. Serial No. 540,189.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Alternating-Current Motors, of which the following is a specification.

My invention relates to dynamo-electric machines and it has special reference to alternating current motors of the commutator type.

The object of my invention is to provide a machine of the class above indicated that shall be relatively simple in construction and have the characteristics of a variable speed direct current shunt motor.

In Patent No. 839,935 granted to the Westinghouse Electric & Manufacturing Company, January 1, 1907, upon an application filed by me, is shown and described an alternating current motor of the commutator type which possesses the characteristics of a direct current shunt motor and in which the field of the motor is excited from one phase of a polyphase source of energy and the armature is supplied with current which is displaced approximately 90° in phase from the field current. According to this arrangement, the armature is connected across a transformer by which the impressed voltage may be adjusted, the field remaining practically constant. A motor constructed in this way may be varied in speed over a wide range by correspondingly adjusting the armature supply voltage.

The principal disadvantage of a motor having the above indicated structure and circuit connections arises from the fact that preventive leads or resistance connections are required in the armature winding in order to reduce the short-circuit current at the brushes. Furthermore, it is difficult to wind the armature for 100 volts or higher for use on a 60 cycle circuit.

It is my aim to provide a motor which shall be capable of a speed variation of approximately 50% and which shall be adapted for a frequency of 60 cycles and for relatively high-voltage circuits. I accomplish this result and obviate the necessity for resistance leads by short-circuiting the armature through the commutator brushes, as in a motor of the repulsion type, and by energizing the field or magnetizing winding from one phase of a polyphase supply circuit and the primary or energy winding from a different phase. The primary or energy winding and the field or magnetizing winding are supplied with currents, which differ in phase by substantially 90°. The speed or the motor may be varied by varying the voltage supplied to the primary or energy winding but, unless a very wide speed variation is required, I propose to vary the exciting current in the field or magnetizing winding by introducing a variable reactance or choke coil. By this means, the 90° phase relation between the two stator windings may be maintained, as is pointed out in my previous patent to which reference has been made.

One of the principal advantages in the use of the motor of my present invention arises from the fact that the frequency in the armature circuit is low, under operating conditions, and, consequently, the current which is short-circuited at the brushes may be held within working limits, since it is dependent upon the armature-current frequency. The armature may be wound for any suitable voltage and current, irrespective of the supply voltage and, consequently, the motor may be adapted for operation on relatively high-voltage circuits. When the motor is used on a two-phase circuit, the primary or energy winding will, of course, be connected to one phase and the field or magnetizing winding to the other phase of the circuit. If it is desired to operate the motor on a three-phase circuit, the usual arrangement of transformers for changing from three-phase to two-phase may be employed, but, in order to avoid the necessity for this auxiliary apparatus, I propose to connect the energy winding across two of the three-phase circuit conductors and to connect the field winding between the middle point of the energy winding and the third conductor. In other words, I establish a two-phase three-phase connection between the motor windings.

In the accompanying drawings, Figure 1 is a diagrammatic view showing the circuit connections for a motor constructed in accordance with my invention and Fig. 2 is a diagrammatic view of a developed stator winding in which the distribution of the energy and magnetizing windings is such as to especially adapt the motor for use on three phase circuits.

Referring to Fig. 1 of the drawings, the motor comprises an armature 1, a commutator cylinder 2, a primary or energy winding 3 and a field or magnetizing winding 4. The commutator cylinder 3 is engaged by brushes 5 and 6 which are short circuited by a conductor 7, the axis of commutation coinciding with the axis of the primary or energy winding. The terminals 10 and 11 of the primary or energy winding are connected to supply circuit conductors 12 and 13 which constitute one phase of the polyphase source of energy. One terminal 14 of the field or magnetizing winding 4 is connected to a supply circuit conductor 15 through a variable reactance coil 16, and the other terminal 17 of the field winding 4 is connected to the supply circuit conductor 18, when the motor is energized from a two-phase source, or to the middle point 19 of the primary or energy winding 3, when the energy is received from a three-phase source, a switch 20 being arranged to interrupt the connection to the tap 19 when the motor is connected to a two-phase circuit.

It is well known that a machine consisting of a stator provided with rectangularly disposed windings supplied from circuits with a 90° phase relation and an armature provided with short circuited commutator brushes will operate as a motor of the repulsion type. With such an arrangement as described, one winding (the axis of whose field coincides with the axis of commutation) is termed the primary or energy winding while the other winding (the axis of whose field is displaced 90 electrical degrees to the axis of commutation) is termed the field or magnetizing winding.

In order that the exciting current which circulates in the two parts of the energy winding may not produce unbalancing or disturbing effects, when the motor is supplied with energy from a three-phase source, it may be found desirable to so distribute the energy winding that the two parts are under each pole of the motor. By this means, the exciting or field currents which flow in opposite directions in the two parts of the energy winding will neutralize each other. In Fig. 2 of the drawings, the two parts of the energy winding are distributed as above indicated, the circuit connections being as follows:—from the brush 21 of a three-phase generator 22, through conductor 23 to coil 24; through coils 25 and 26, connector 27, coils 28, 29 and 30, connector 31, coils 32, 33 and 34, connector 35 coils 36, 37 and 38 and conductor 39 to generator brush 40. The field or magnetizing winding is connected, at one terminal, to brush 41 of the generator, circuit being completed from this point through conductor 42, coils 43, 44 and 45, connector 46, coils 47, 48 and 49, connector 50, coils 51, 52 and 53, connector 54, coils 55, 56 and 57 and conductor 58 to the connector 31 which joins the two halves of the energy winding.

It will be apparent from the foregoing statement respecting the flow of currents in the respective portions of the windings, that the exciting currents from the connector 58 will flow in opposite directions in the connector 31, and, consequently, will neutralize each other as regards coils 24, 25, 26 and coils 32, 33, 34 and also as regards coils 28 29, 30 and coils 36, 37, 38.

I desire that my invention shall not be limited to the arrangement shown and described, and that modifications which do not depart from the spirit of my invention shall be included within its scope.

I claim as my invention:

1. In an alternating-current motor, the combination with an armature and a commutator having short-circuited brushes, of a field or magnetizing winding, a primary or energy winding the axis of which coincides with the axis of commutation of said brushes, one terminal of the field or magnetizing winding being connected to an intermediate point in the primary or energy winding, in order to produce a two-phase excitation in said windings when connected to a three-phase source of energy and a variable reactance in circuit with said field or magnetizing winding.

2. In an alternating-current motor, the combination with an armature and a commutator having short-circuited brushes, of a field or magnetizing winding, a primary or energy winding, the axis of which coincides with the axis of commutation of said brushes, one terminal of the field or magnetizing winding being connected to an intermediate point in the primary or energy winding, in order to produce a two-phase excitation in said windings when connected to a three-phase source of energy, and means for adjusting the excitation of said field winding without altering the phase relation between the currents in the said windings.

3. In an alternating-current motor the combination with an armature having short-circuited brushes, of a primary or energy winding and a field or magnetizing winding, one terminal of the field or magnetizing winding being connected to an intermediate point in the primary or energy winding in order to produce a two-phase excitation in said windings when connected to a three-phase source of energy, and each of the parts of the said primary or energy winding being so distributed as to be within the influence of each of the magnetic poles produced by the said field or magnetizing winding.

4. In an alternating-current motor, the combination with an armature having short-circuited brushes, of a primary or energy winding and a field or magnetizing winding, one terminal of the field or magnetizing winding being connected to an intermediate point on the primary or energy winding in order to produce a two-phase excitation in said windings when connected to a three-phase source of energy, and each of the parts of the primary or energy winding being so distributed that the magnetizing component of the current shall flow in opposite directions in adjacent parts of said winding.

5. In an alternating-current motor, the combination with an armature having short-circuited brushes, of a primary or energy winding and a field or magnetizing winding, one terminal of the field or magnetizing winding being connected to an intermediate point on the primary or energy winding in order to produce a two-phase excitation in said windings when connected to a three-phase source of energy and each of the parts of the primary or energy winding being so distributed as to produce a neutral magnetizing effect.

In testimony whereof, I have hereunto subscribed my name this 19th day of Jan., 1910.

BENJ. G. LAMME.

Witnesses:
E. LIVINGSTONE,
B. B. HINES.